United States Patent
Cheng

(10) Patent No.: US 7,436,400 B2
(45) Date of Patent: Oct. 14, 2008

(54) INTERFACE APPARATUS COMBINING DISPLAY PANEL AND SHAFT

(75) Inventor: Linix Cheng, Tainan Hsien (TW)

(73) Assignee: Qisda Corporation, Shan-Ting Tsun, Gueishan Hsiang, Taoyuan County (TW)

(*) Notice: Subject to any disclaimer, the term of this patent is extended or adjusted under 35 U.S.C. 154(b) by 222 days.

(21) Appl. No.: 10/710,665

(22) Filed: Jul. 28, 2004

(65) Prior Publication Data

US 2005/0068294 A1   Mar. 31, 2005

(30) Foreign Application Priority Data

Aug. 27, 2003   (TW) ............... 92123666 A

(51) Int. Cl.
G09G 5/00 (2006.01)
G09G 5/08 (2006.01)
A63F 9/24 (2006.01)
G05B 15/00 (2006.01)

(52) U.S. Cl. .................. 345/204; 345/156; 345/161; 345/184; 463/36; 463/37; 463/38; 700/83; 700/85; 14/412; 14/413; 14/414; 14/415; 14/416

(58) Field of Classification Search .................. 345/204
See application file for complete search history.

(56) References Cited

U.S. PATENT DOCUMENTS

| | | | | |
|---|---|---|---|---|
| 4,895,376 A * | 1/1990 | Chiang Shiung-Fei | ......... | 463/2 |
| 5,436,638 A * | 7/1995 | Bolas et al. | .................. | 345/156 |
| 6,115,025 A * | 9/2000 | Buxton et al. | ............... | 345/659 |
| 6,248,017 B1 * | 6/2001 | Roach | .......... | 463/37 |
| 6,427,288 B1 * | 8/2002 | Saito | ............ | 16/361 |
| 7,034,814 B2 * | 4/2006 | Gong et al. | ................. | 345/211 |

* cited by examiner

Primary Examiner—Sumati Lefkowitz
Assistant Examiner—Alexander S. Beck
(74) Attorney, Agent, or Firm—Winston Hsu

(57) ABSTRACT

The interface apparatus includes a base, a shaft installed on the base in a moveable way, a detecting module for detecting movement of the shaft, and a display panel with at least a handle installed on the shaft. When a user holds the handle to move the display panel/shaft, a detecting signal, accordingly generated by the detecting module, can be transmitted to a mainframe of the computer system as an input of the computer system.

6 Claims, 23 Drawing Sheets

INTERFACE APPARATUS COMBINING DISPLAY PANEL AND SHAFT

BACKGROUND OF INVENTION

1. Field of the Invention

The invention relates to an interface apparatus of an interactive man-machine interface apparatus, and more particularly, to an interface apparatus combining a shaft and a display panel.

2. Description of the Prior Art

Computer systems and related accessories are popularly used and becoming increasingly indispensable. New applications of computer systems, such as audio-video games and virtual reality programs, are continuously being developed. The audio-video games and the virtual reality programs are not only interactive entertainment but also practical applications. For example, users can repeatedly practice driving skills utilizing a driving practice program without high cost and danger.

Please refer to FIG. 1, which is a diagram of a computer system 10 according to the prior art. The computer system 10 executes an audio-video game or a virtual reality program in a mainframe 12. The computer system 10 further has a display panel 14 and a pointing apparatus 16 (such as a shaft in FIG. 1, a mouse, or a touch panel) to be a man-machine interface. When a user moves the pointing apparatus 16, the pointing apparatus 16 will detect actions of the user and produce corresponding electric signals to the mainframe 12. The mainframe 12 performs corresponding operations in accordance with the electric signals and transfers the results of the operations to the display panel 14. The display panel 14 shows the results as images. Thus, the computer system 10 achieves the man-machine I/O (input/output) interaction with the pointing apparatus 16 and the display panel 14.

However, in the above-mentioned prior art, the man-machine I/O interfaces are independent, in lack of linkage, and cannot provide the user a real experience. Please refer to FIG. 2 (and FIG. 1), it shows an image of the display panel 14 displaying a virtual environment. Assume that the computer system 10 displays a curved road on the display panel 14 to simulate a virtual driving environment, as FIG. 2 shows. The curved road may be tilted in actuality to counteract centripetal forces of a car, so is the virtual curved road in the display panel 14. The driver in reality is tilted with the car at the same time, however, in the computer system 10, the display panel 14 is immovable and cannot be tilted with the virtual curved road, and so the display panel 14 cannot provide the user a real experience.

Please refer to FIG. 3, which is an image of a first-personal view game displayed on the display panel 14. The user can control the pointing apparatus 16 to realize his actions in the virtual environment while playing the first-personal view game and the display panel 14 shows a first person view of the virtual environment. For example, when the user want to turn left in the virtual environment, he can control the pointing apparatus 16 to perform a "turn left" operation, and the scenery located on the left in the display panel 14 will be moved to the center to achieve a "having turned left" impression. Again, the display panel 14 is immovable and the user's body is also immovable, going against what is seen. This situation will cause dizziness or discomfort to the user.

SUMMARY OF INVENTION

It is therefore a primary objective of the claimed invention to provide an interface apparatus combining a pointing apparatus and a display panel that can achieve the combination of the input and output interfaces of the man-machine interaction. The interface apparatus is inexpensive, comfortable, and presents a more realistic experience.

The claimed invention combines the shaft and the display panel together. Users can hold the handle on the display panel and move it, and the shaft is moved together with the display panel. With the claimed invention, the virtual environment is lifelike and comfortable.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
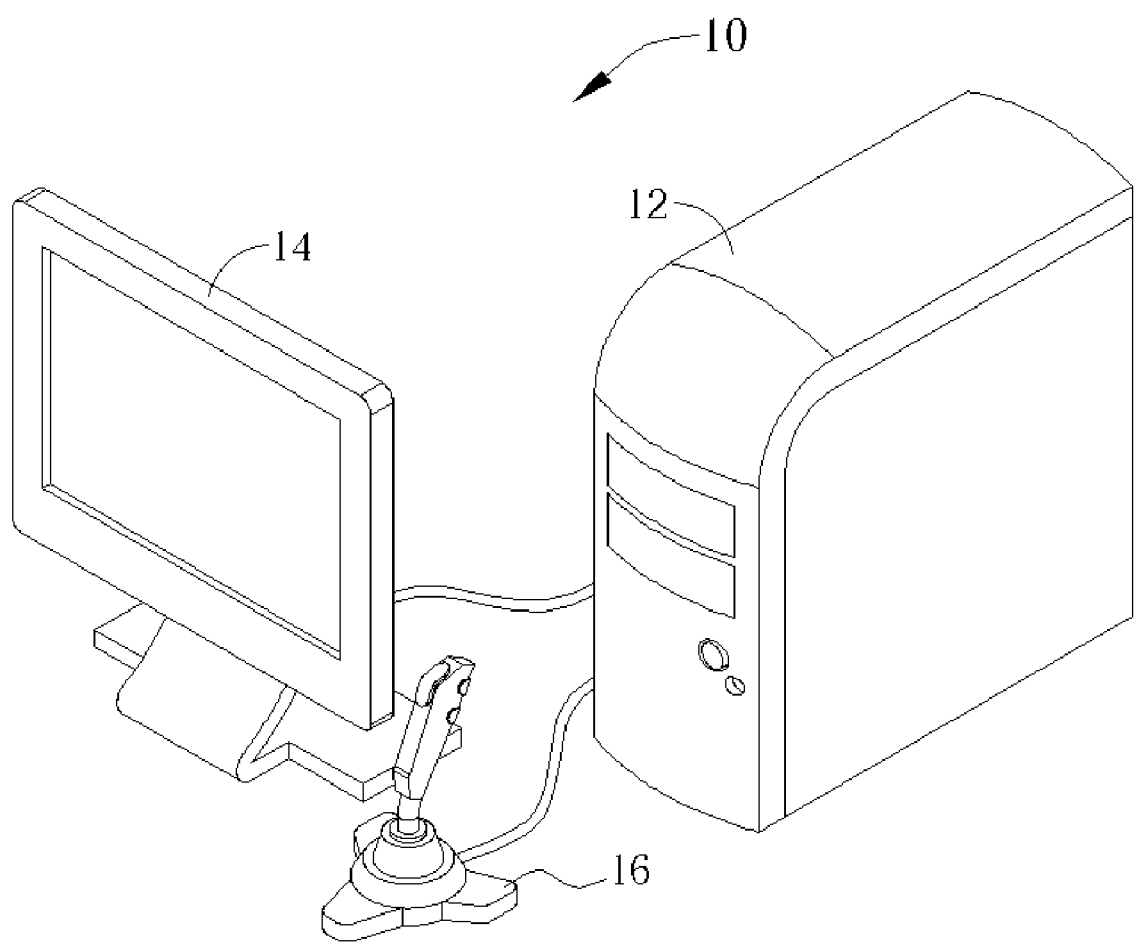
FIG. 1 is a schematic diagram of a computer system according to prior art.
Figure 2:
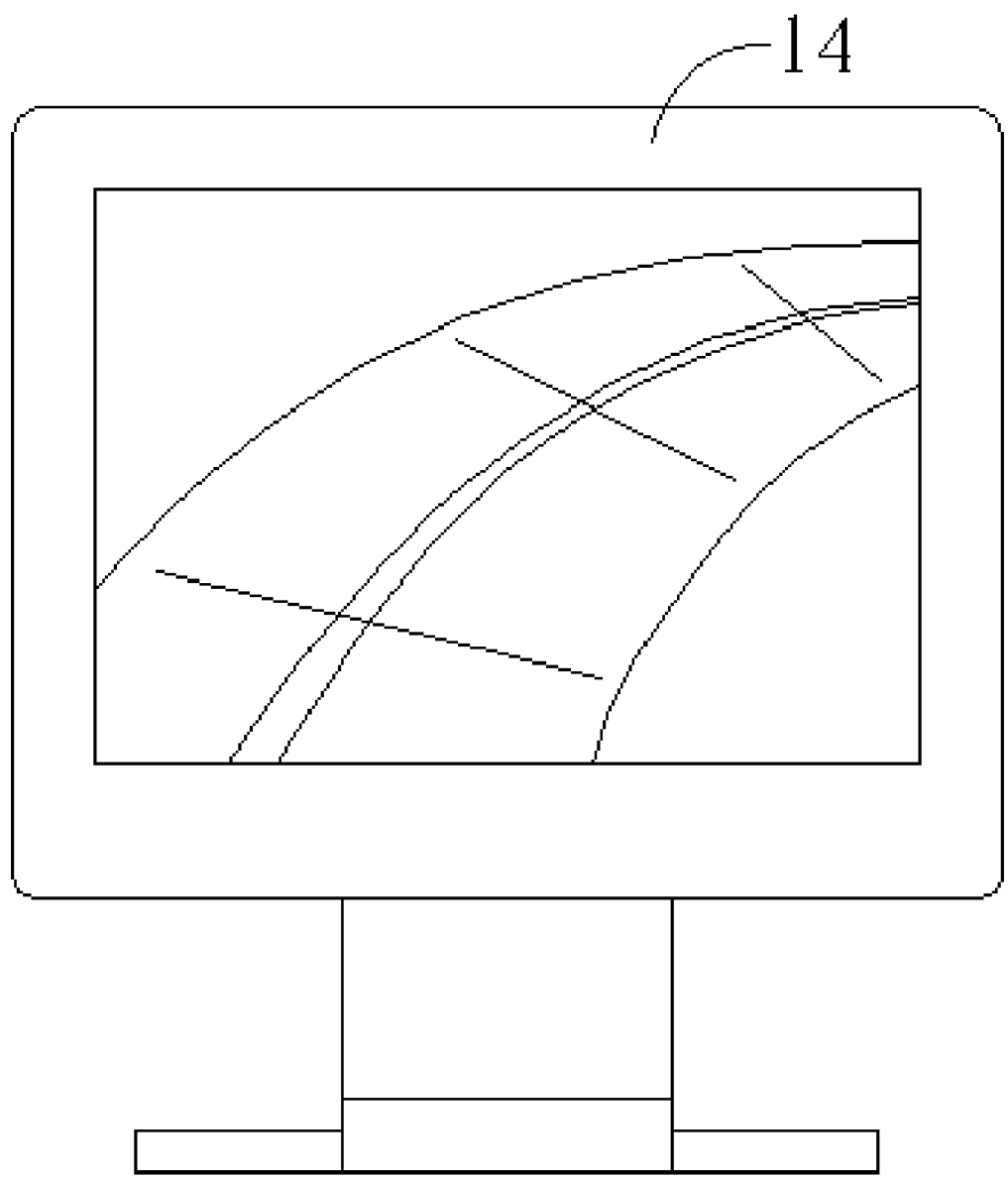
FIGS. 2-3 are schematic diagrams of a virtual environment shown on a display panel.
Figure 3:
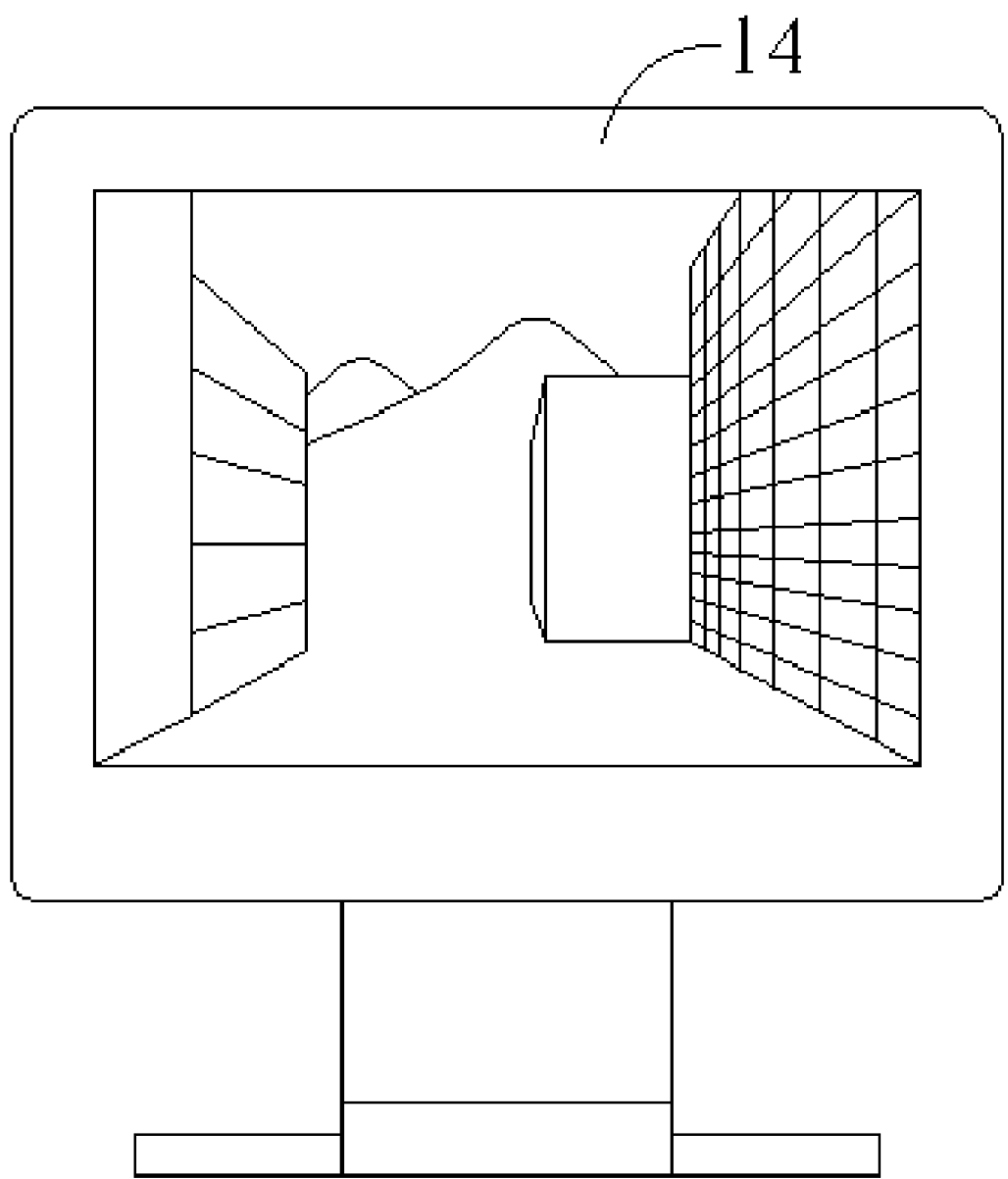
Figure 4:
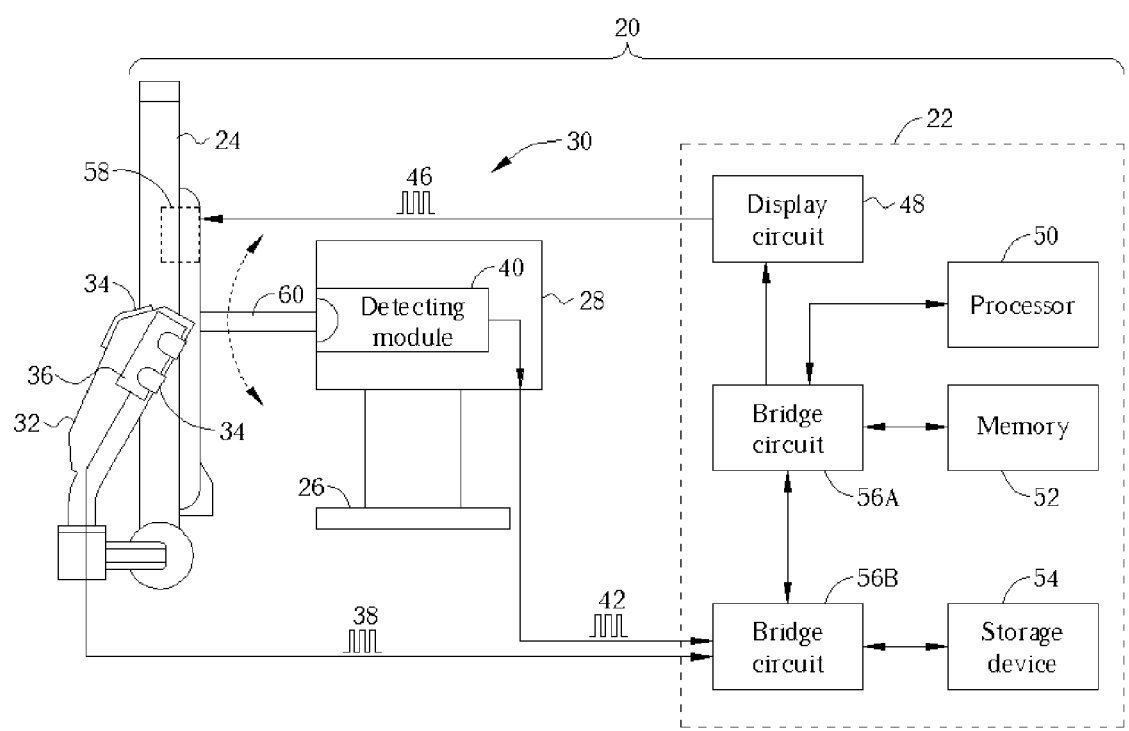
FIG. 4 is a functional diagram of a computer system according to present invention.
Figure 5:
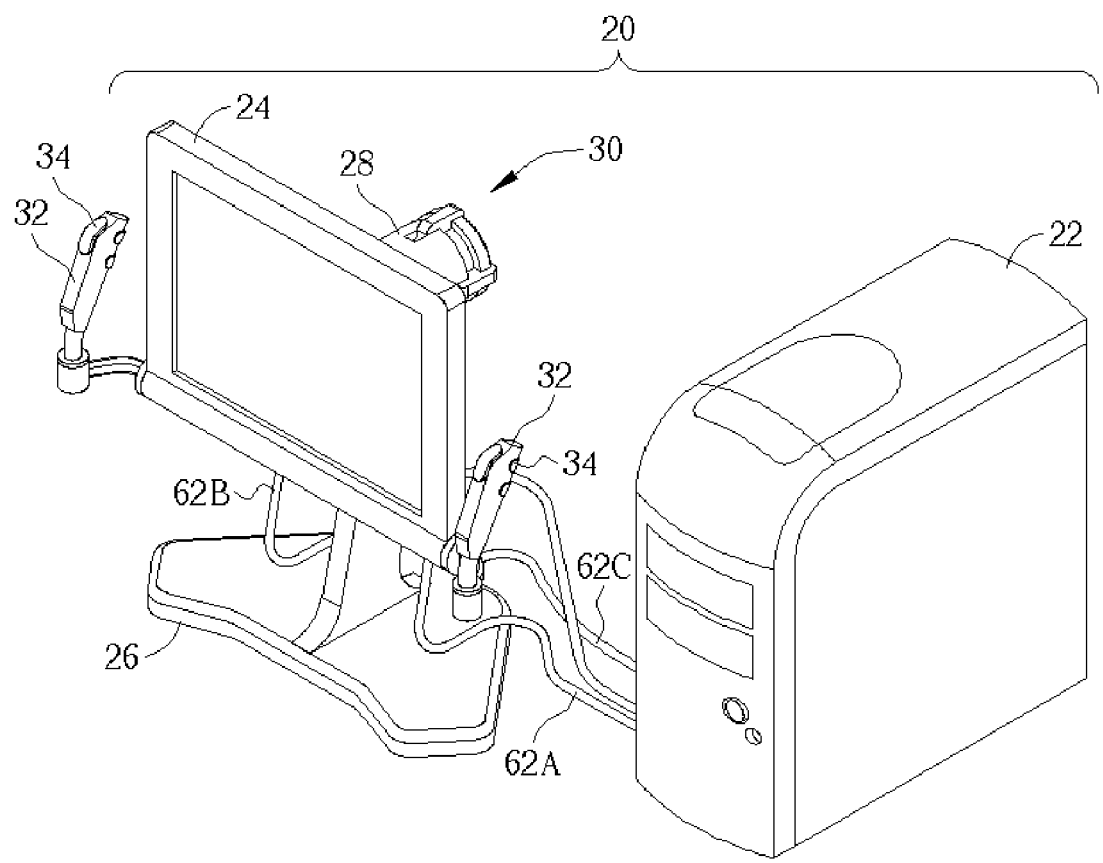
FIG. 5 is a schematic diagram of an interface apparatus and a mainframe.
Figure 6:
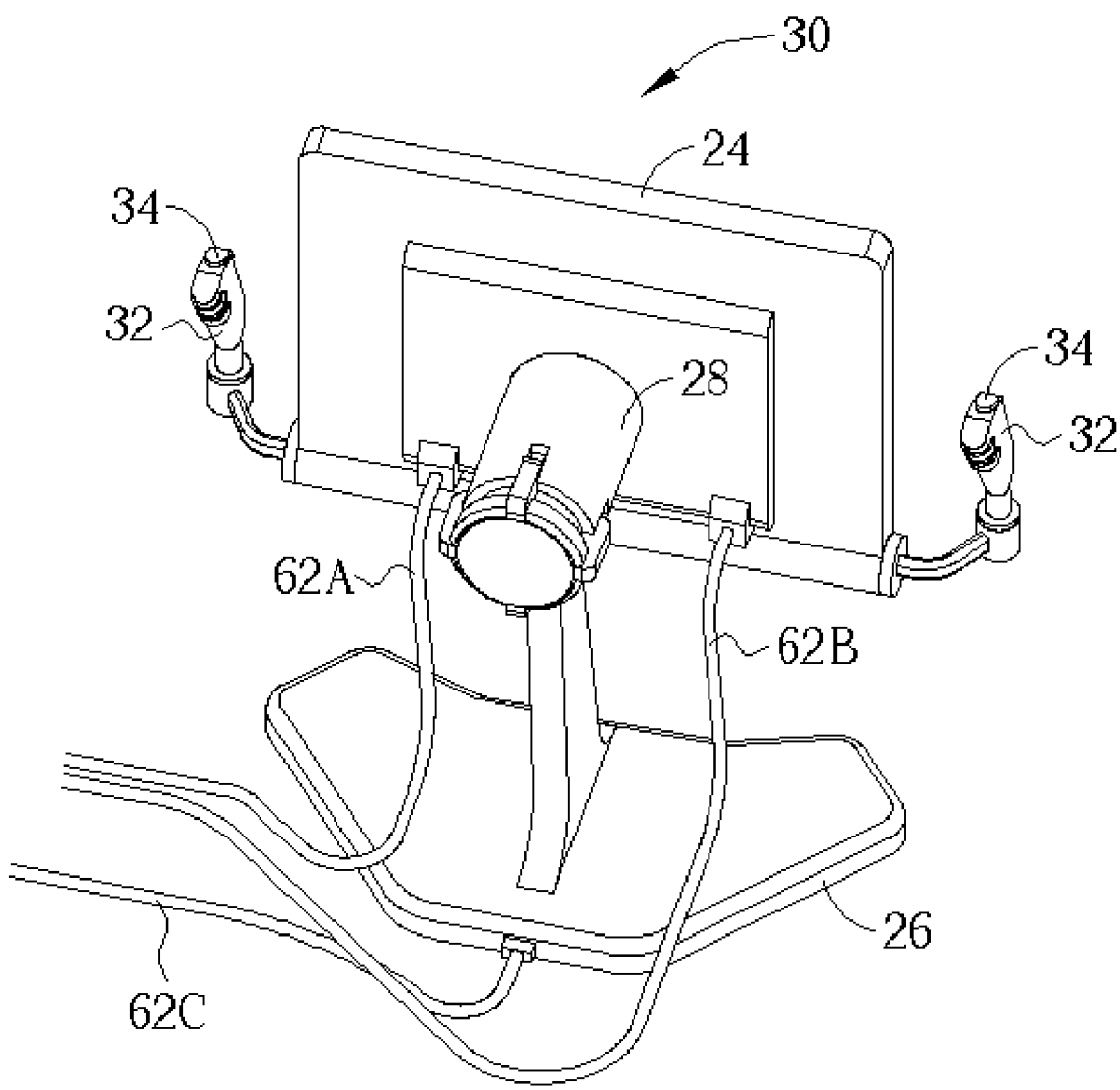
FIG. 6 is a rear view of an interface apparatus.
Figure 7:
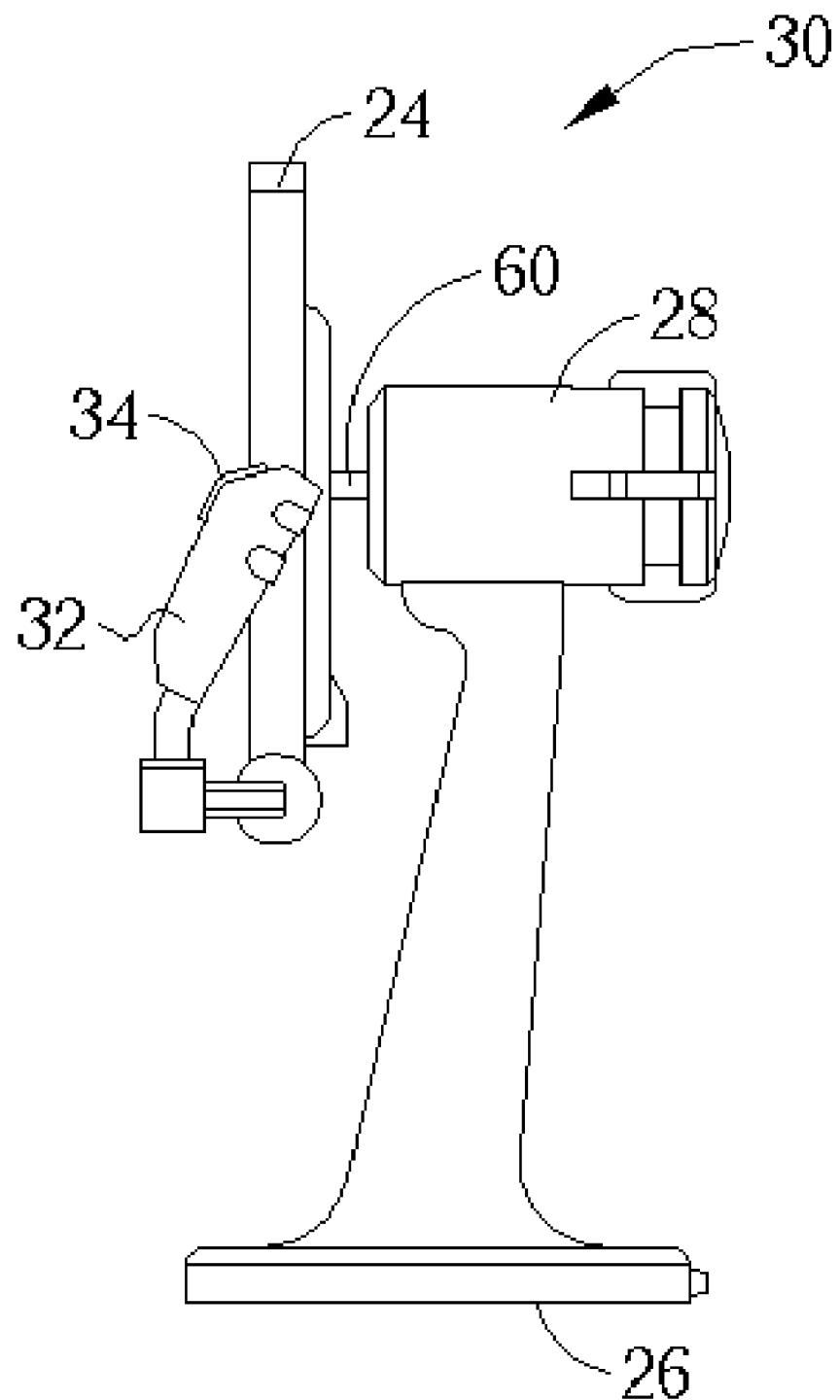
FIG. 7 is a side view of an interface apparatus.

Please refer to FIGS. 4-7. FIG. 4 is a functional diagram of a computer system 20 formed by an interface apparatus 30 and a mainframe 22. FIG. 5 is a schematic diagram of the interface apparatus 30 and the mainframe 22. FIG. 6 and FIG. 7 are a rear view and a side view of the interface apparatus 30. The interface apparatus 30 has a base 26, a shaft base 28, a shaft 60, and a display panel 24. The base 26 is fixed and the shaft base 28 is located thereon. The shaft 60 is movably disposed on the shaft base 28 (rotatably and slidably), and the display panel 24 (such as a LCD) is connected to the shaft 60. On the display panel 24, at least one handle 32 is included for the users to hold.

As FIG. 4 shows, a detecting module 40 is designed in the interface apparatus 30 to detect the rotation and sliding of the shaft 60, and to produce a corresponding detecting signal 42 transmitting to the mainframe 22. At least one button 34 is designed on the display panel 24 or on the handle 32. The button 34 receives user's input and generates a corresponding button signal 38 to the mainframe 22. The display panel 24 receives a video signal 46 from the mainframe 22 through a receiving circuit 58 and transforms the video signal 46 into a corresponding image. In the computer system 20, the mainframe 22 can be a personal computer or a console (such as a Microsoft's XBOX or a SONY's PS2).

The mainframe 22 has a processor 50, a volatile memory 52 (such as a DRAM), a non-volatile storage device 54 (such as a hard disk, a CD-ROM, or a flash memory), a display circuit 48 (such as a display card or a chip), and two bridge circuits 56A, 56B (such as a north bridge circuit and a south bridge circuit in a personal computer). The processor 50 controls the operation of the mainframe 22. The display circuit 48 processes the video signal 46. The memory 52 stores programs and data required by the processor 50. The bridge circuit 56A processes data transmitted between the display circuit 48, the memory 52, and the processor 50. The storage device 54 stores programs and data required by the mainframe 22 in a non-volatile way. The bridge circuits 56A, 56B are used for processing data transmitted between the storage device 54 and the processor 50, receiving the button signal 38 and the detecting signal 42 from the interface apparatus 30, and outputting these signals to the processor 50.

The user holds the handle 32 to make the display panel 24 and the shaft 60 move or rotate as a whole. Meanwhile, the detecting module 40 detects the movement of the shaft 60 and outputs the corresponding detecting signal 42. After the mainframe 22 receives the detecting signal 42, the processor 50 can operate according to the detecting signal 42 and output the result to the display circuit 48. The display circuit 48 produces the corresponding video signal 46 and transmits the video signal 46 to the receiving circuit 58 of the interface apparatus 30; the display panel 24 transforms the video signal 46 to an image and displays the image thereon. In other words, in the interface apparatus 30, the shaft 60 (the input interface) and the display panel 24 (the output interface) are combined together and have a physically connected relationship. When users operate the mainframe 22 through the shaft 60, the display panel 24 is driven to move, so that the users can have the same visual feedback directly. In addition, when users press the button 34 of the interface apparatus 30, the button circuit 36 will transmit the corresponding button signal 34 to the mainframe 22 and play a role of input to the mainframe 22.

In the interface apparatus 30, the button signal 38 and the detecting signal 42 can be transmitted through a cable 62A (in FIG. 5, FIG. 6) to the mainframe 22 (the mainframe 22 is not drawn in FIG. 6). The mainframe 22 transmits the video signal 46 back to the interface apparatus 30 through another cable 62B. The electrical power required by the interface apparatus 30 can be supplied by a cable 62C. The cable 62C can be connected to the mainframe 22 to obtain the power, or can be connected to an external power supply. The interface apparatus 30 can also use a battery instead of using the cable 62C.

In addition, the communication between the interface apparatus 30 and the mainframe 22 can be wireless (such as electromagnetic wave or infrared ray). A transceiver circuit can be equipped on the interface apparatus 30 to transmit the button signal 38 and the detecting signal 42 to the mainframe 22 in a wireless way. The mainframe 22 can be equipped with another transceiver circuit to transmit the video signal 46 to the interface apparatus 30 in a wireless way (under this condition, the bridge circuit 56B and the receiving circuit 58 also have functions of receiving wireless signals). Obviously, in a wireless communication situation, the cables 62A, 62B are not needed between the interface apparatus 30 and the mainframe 22. Furthermore, if necessary, there can be a speaker (not shown) disposed on the interface apparatus 30 to receive audio signals from the mainframe 22 and play the corresponding sound.

Figure 8:
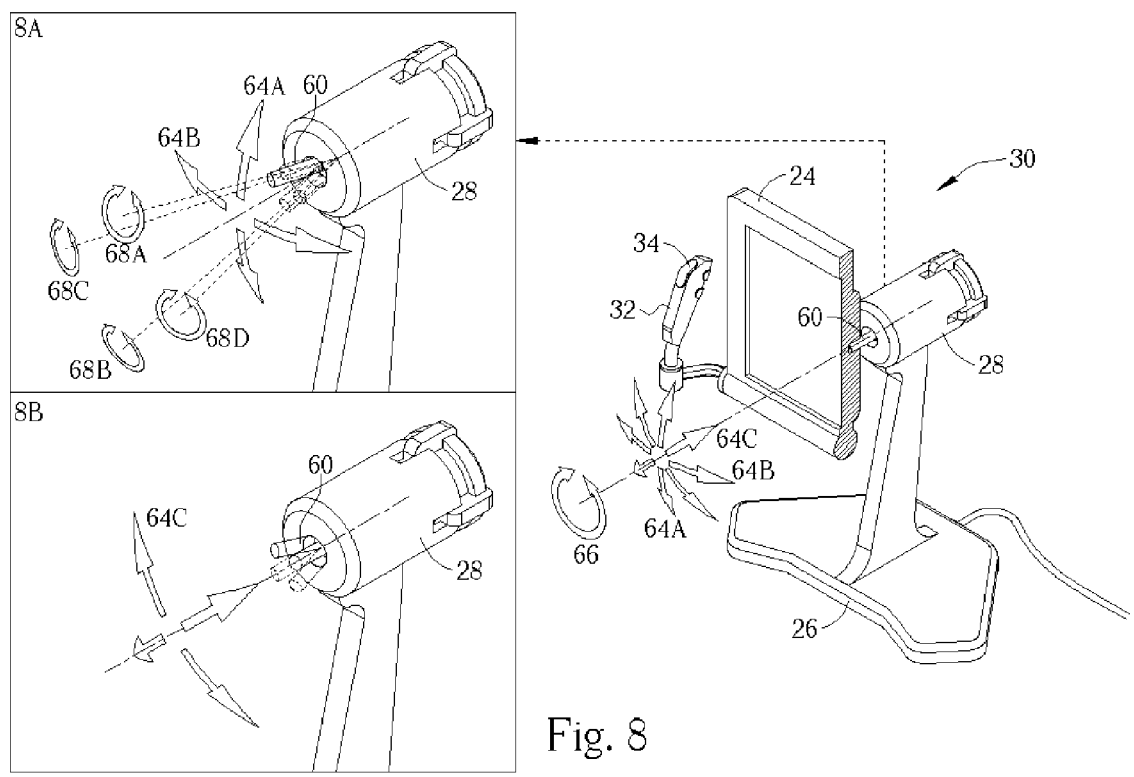
FIG. 8 is a schematic diagram showed the movement of an interface apparatus.

When using the interface apparatus 30, users hold the handle 32 to move the combination of the display panel 24 and the shaft 60 together. In the preferred embodiment, the shaft 60 can perform a multi-dimensional movement. Please refer to FIG. 8 (and FIGS. 4-7), which shows the movement of the shaft 60 (the display panel 24 is partially omitted in FIG. 8). As FIGS. 8, 8A, and 8B show, the shaft 60 can freely move up/down, left/right, and diagonally along the arrows 64A, 64B and 64C, and can rotate along the arrow 66. For example, when the shaft 60 is at center position, it can be rotated along the arrow 66, and when the shaft 60 is moved up, down, left, or right, it can be rotated along the arrows 68A, 68B, 68C and 68D.

Figure 9:
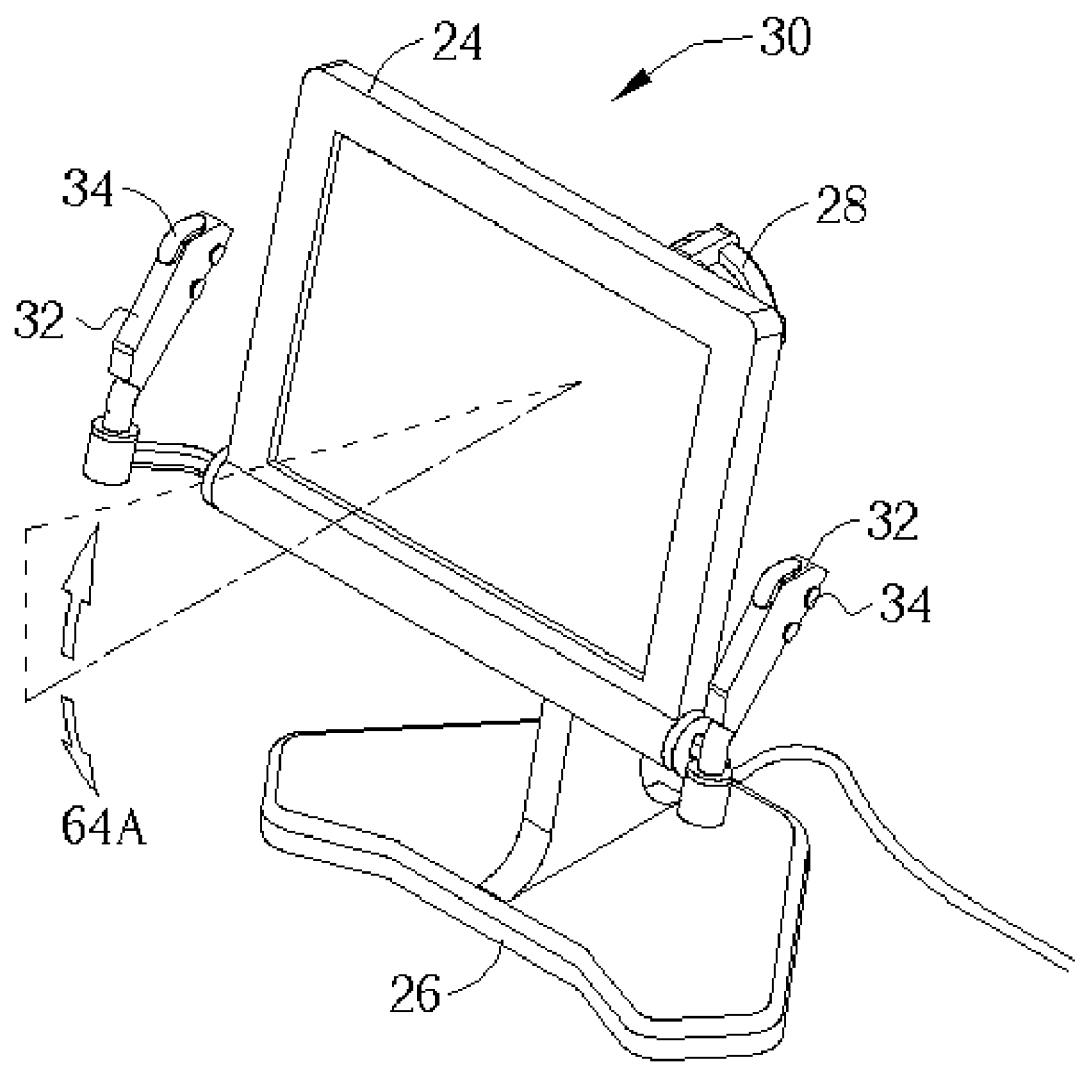
FIGS. 9-18 are schematic diagrams showing the movement along different directions of an interface apparatus.
Figure 10:
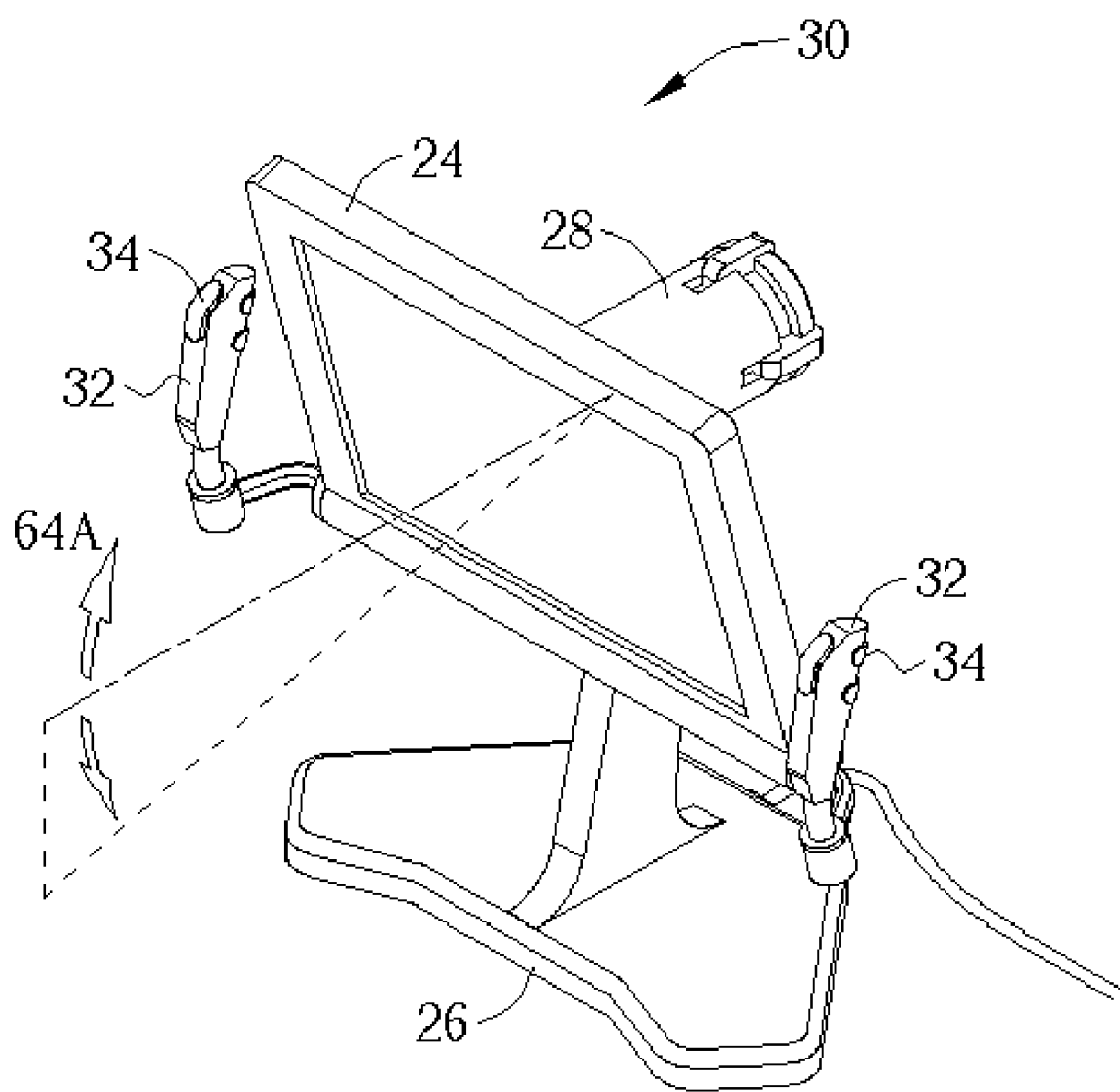
Figure 11:
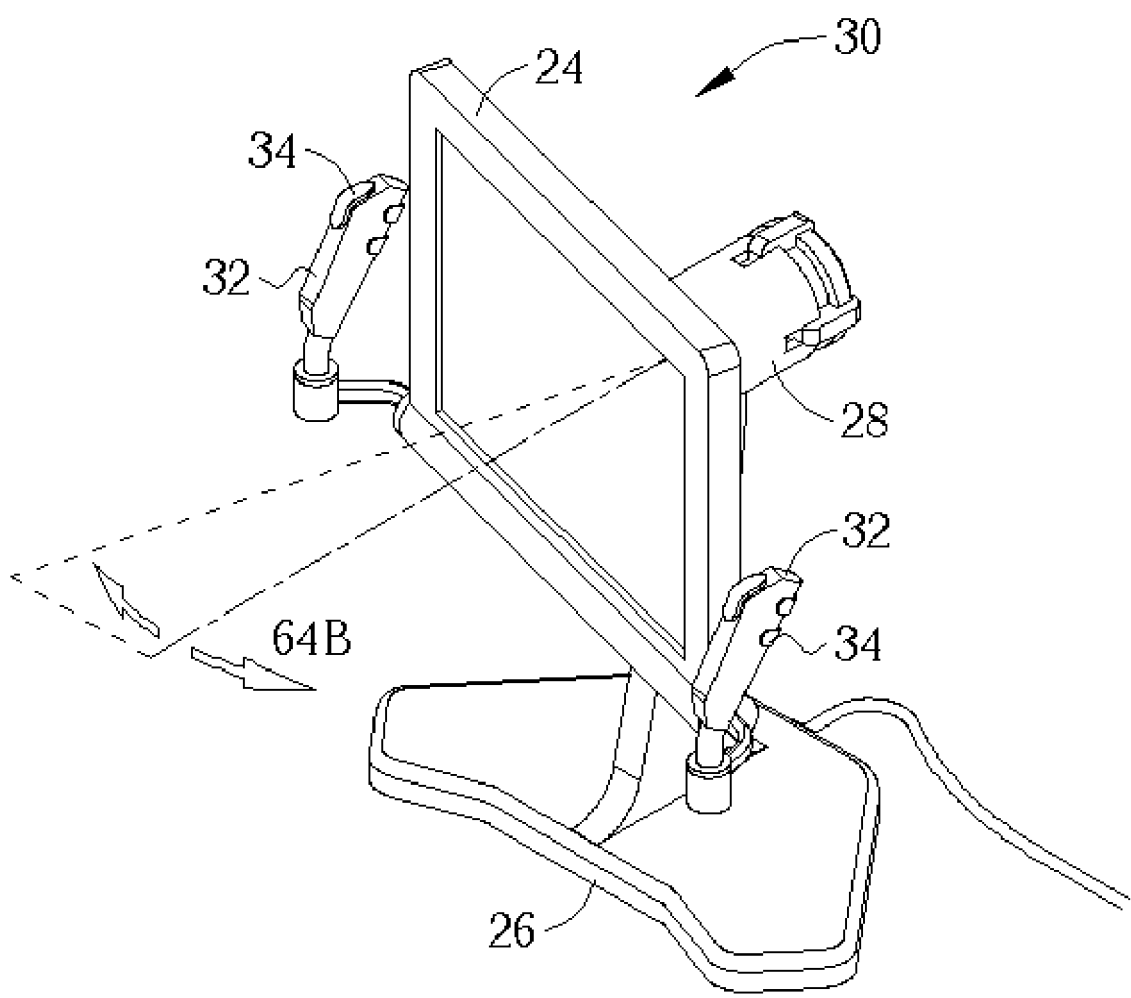
Figure 12:
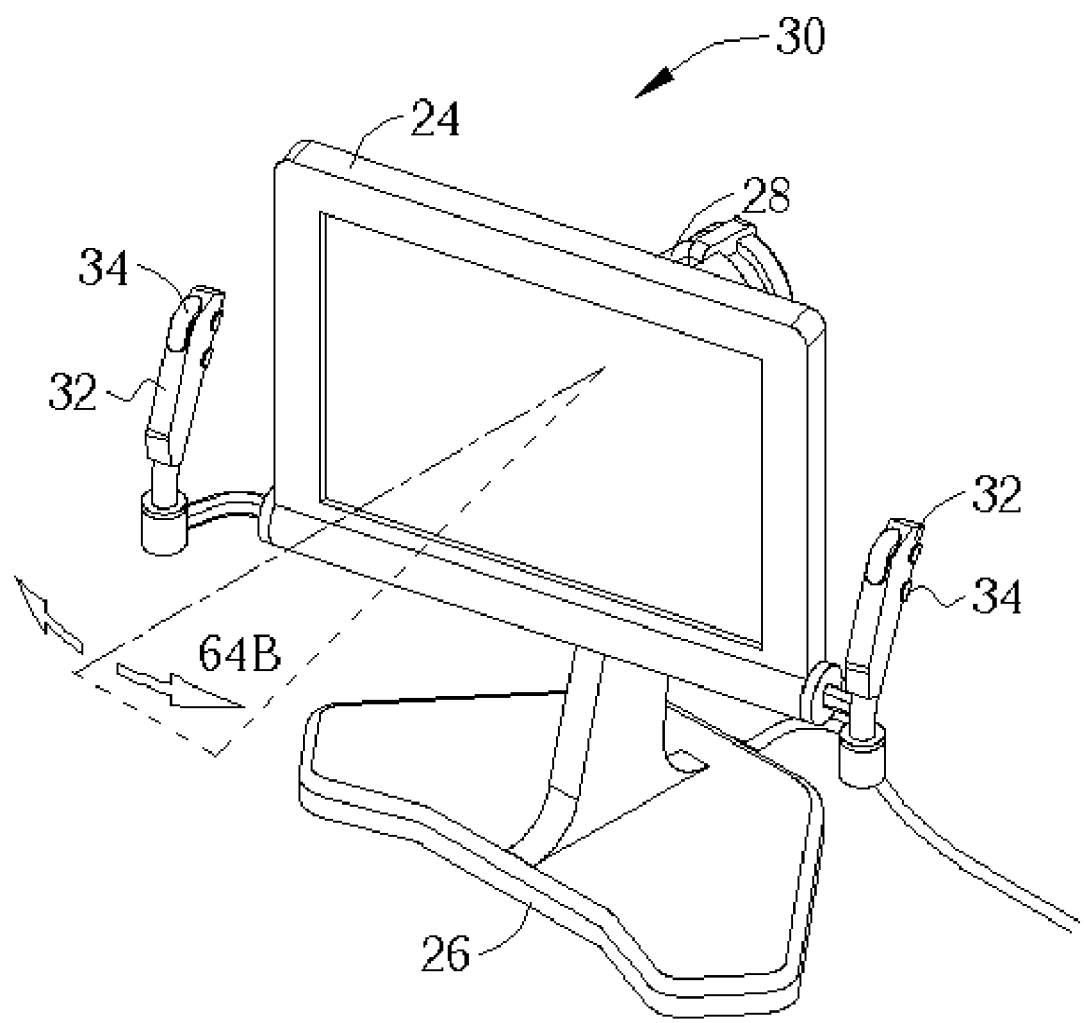
Figure 13:
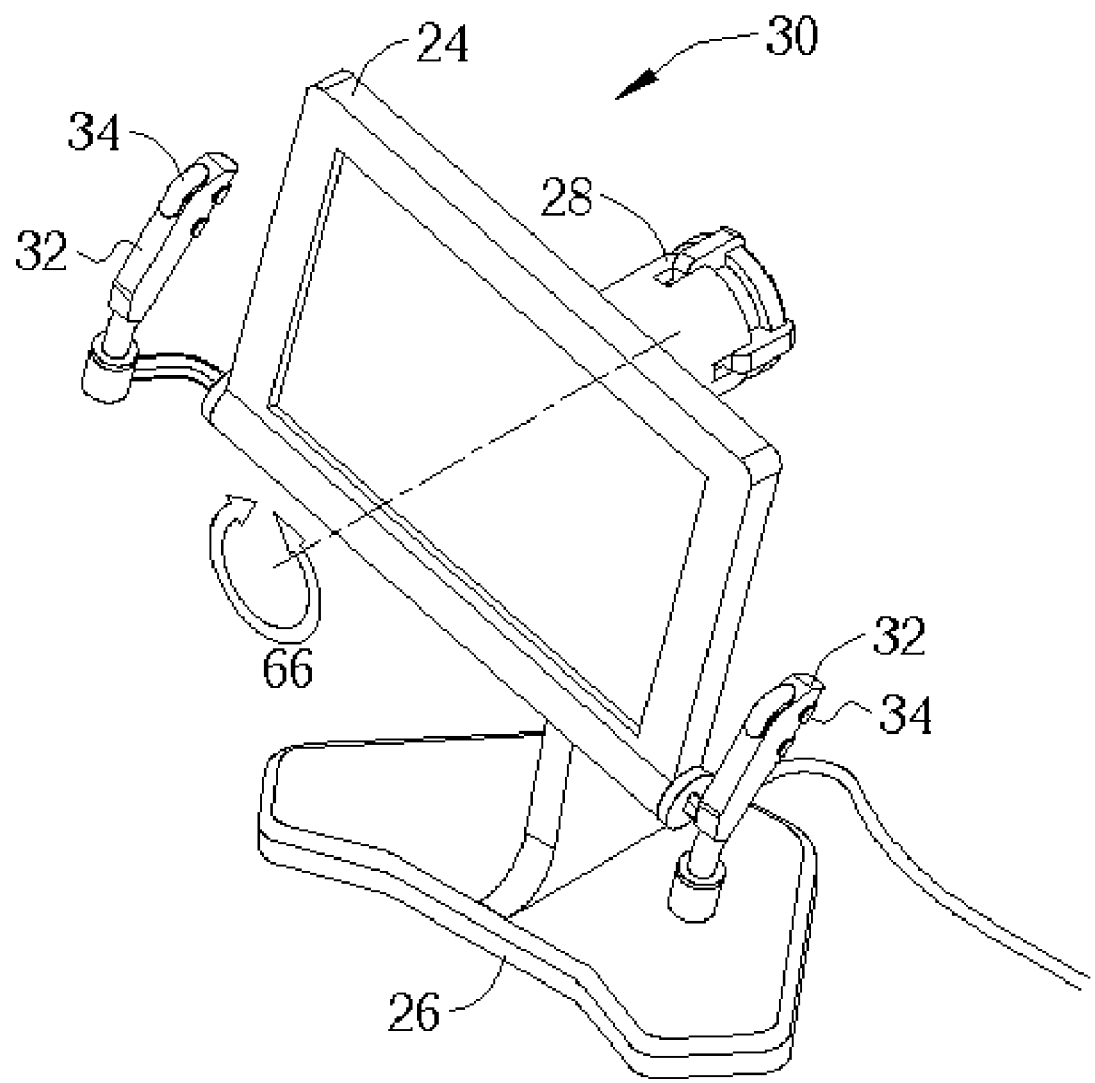
Figure 14:
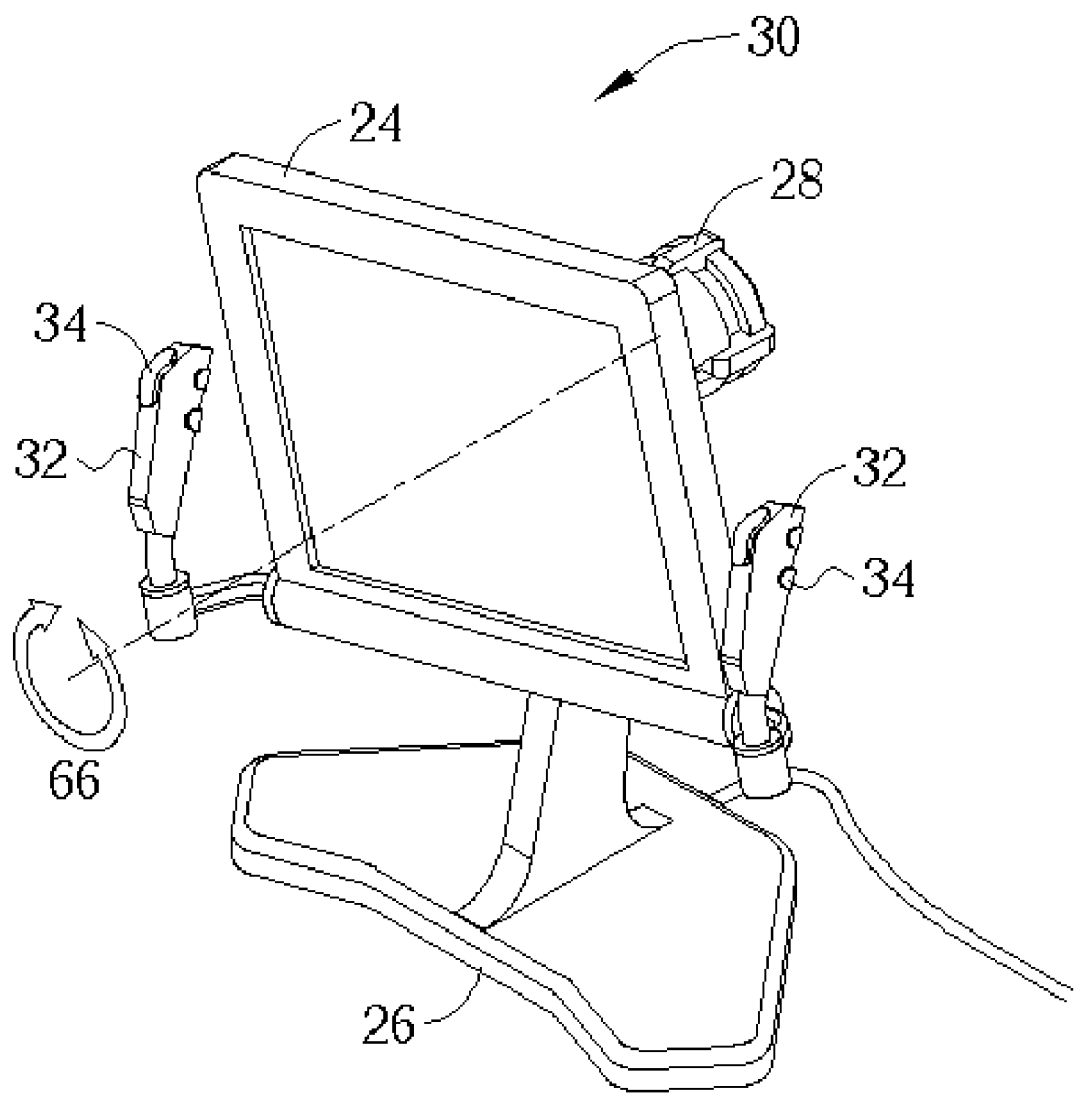

In the present invention, the multi-dimensional movement of the shaft 60 allows users to operate the interface apparatus 30 in different directions. Please refer to FIGS. 9-18, which show the interface apparatus 30 moving in different directions. As FIGS. 9-10 show, users can move the display panel 24 up or down along the arrow 64A (similar to the operation of an airplane). As FIGS. 11-12 show, the display panel 24 and the shaft 60 can be turned left or right along the arrow 64B. As FIGS. 13-14 show, users can rotate the display panel 24 and the shaft 60 along the central axis as shown by the arrow 66 (similar to a car's steering wheel).

Figure 15:
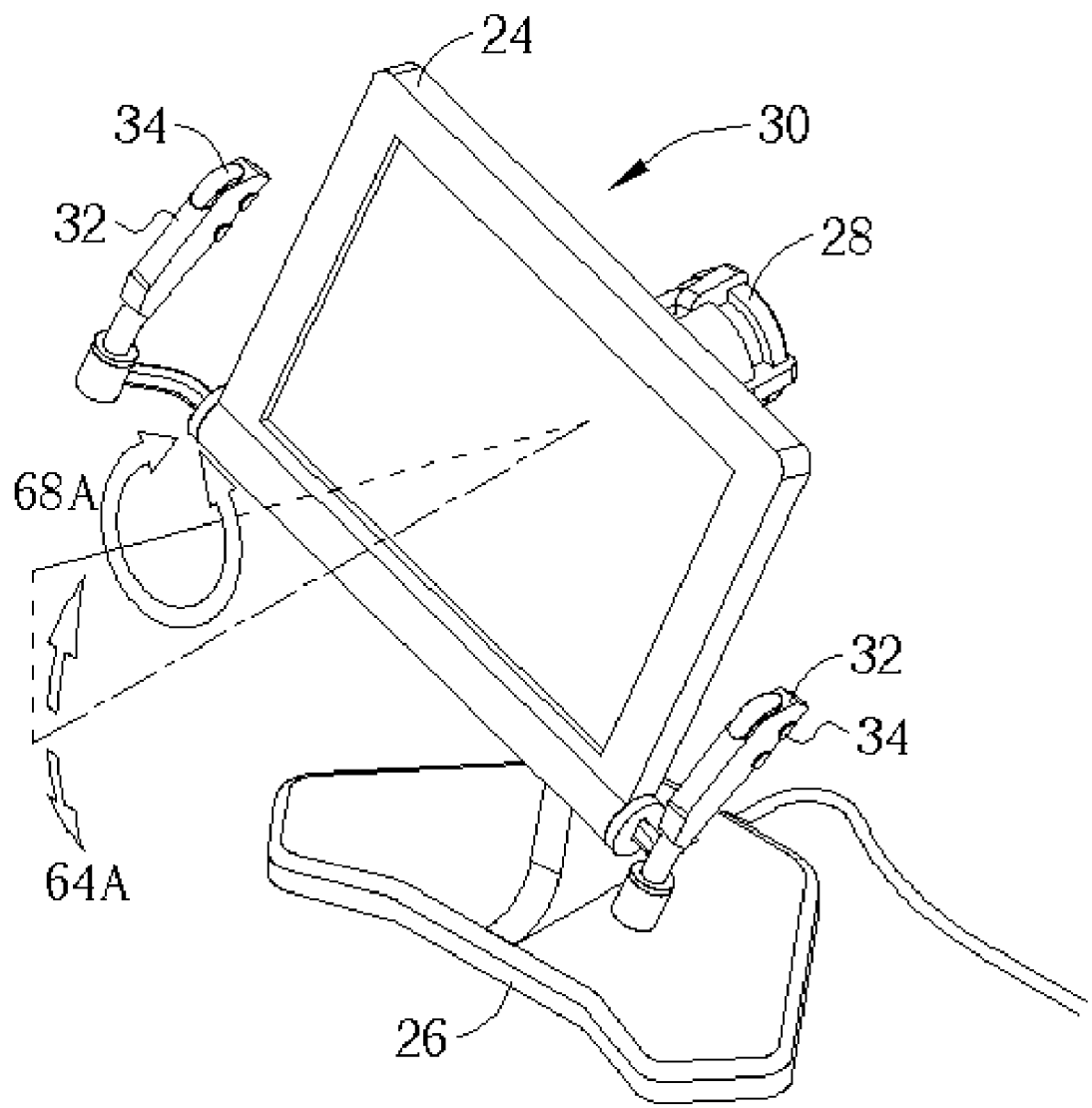
Figure 16:
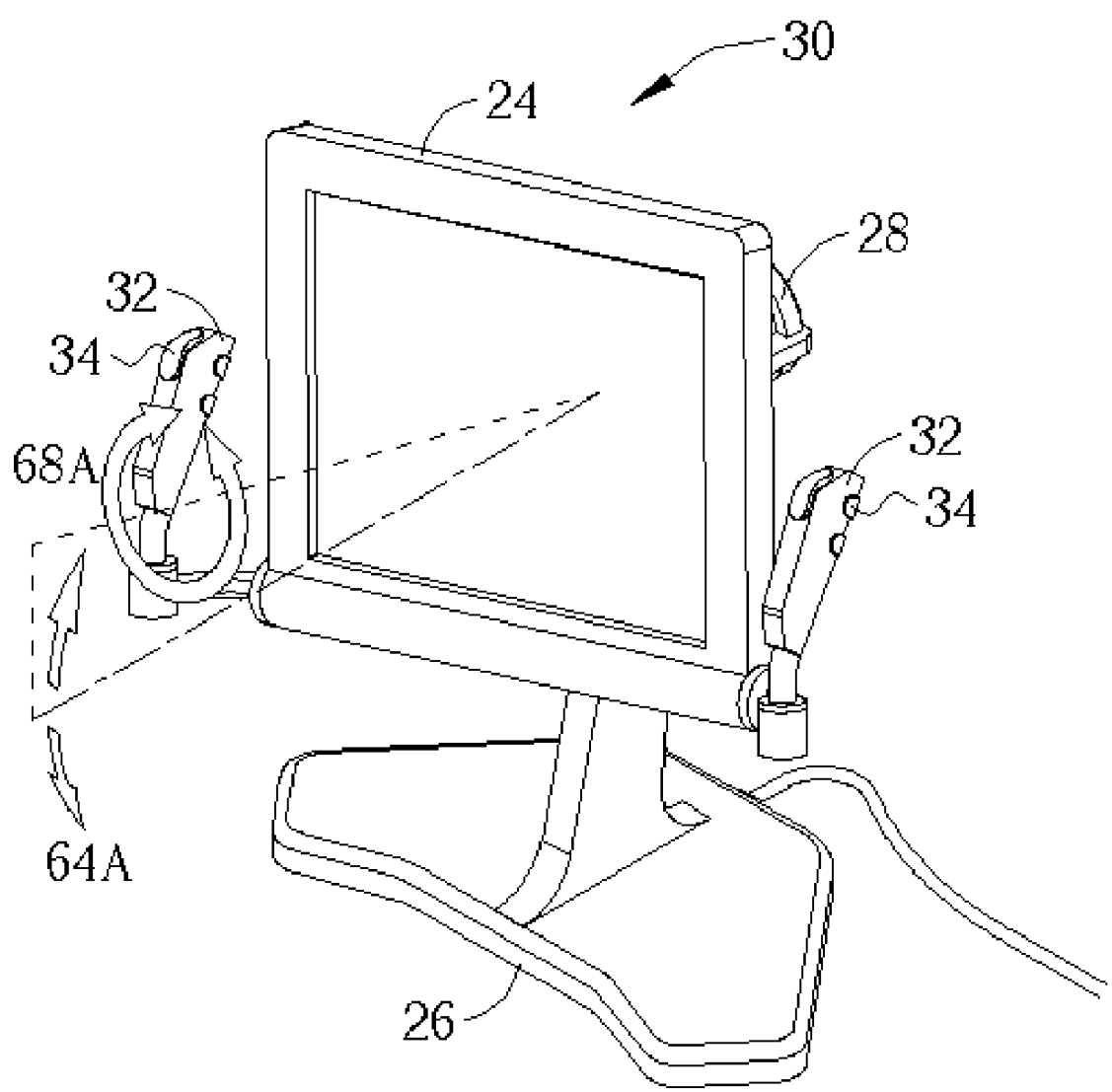
Figure 17:
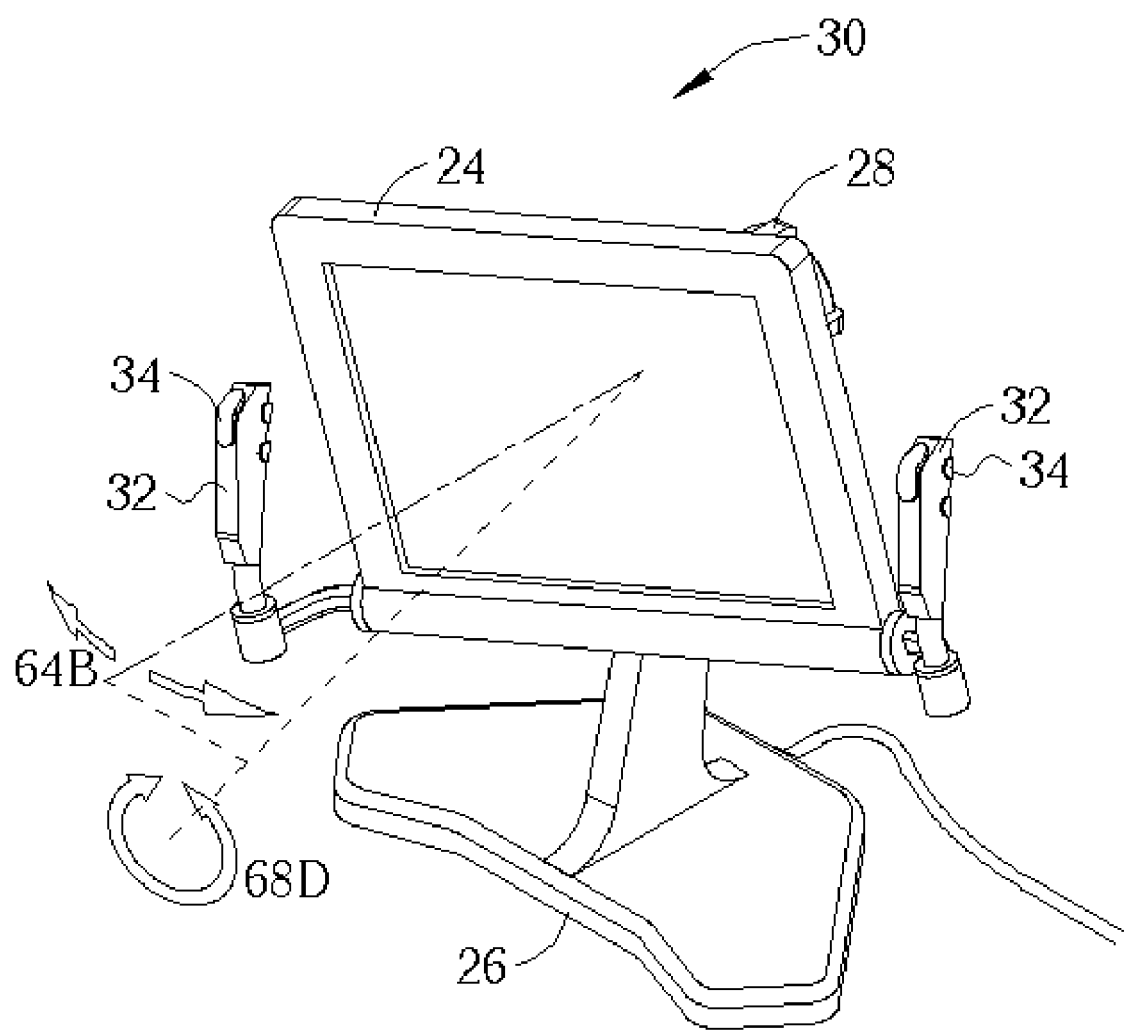
Figure 18:
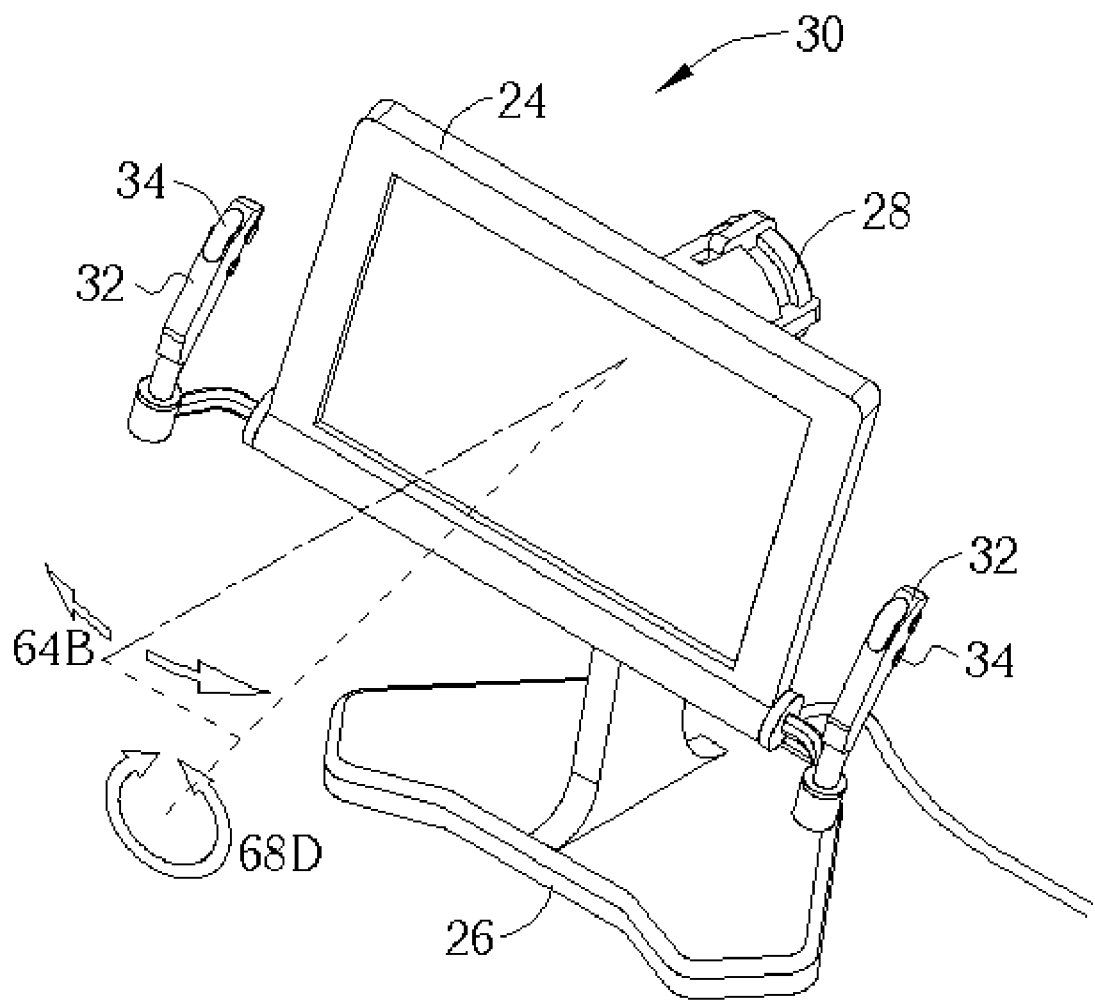

By combining the movements in different directions, the interface apparatus can produce various operating modes. For example, as FIGS. 15-16 show, after moving up along the arrow 64A, the display panel 24 and the shaft 60 can be further rotated along the arrow 68A. Of course, as FIGS. 17-18 show, the display panel 24 and the shaft 60 can be rotated along the arrow 68D after moving up along the arrow 64B. These multi-dimensional operations of the display panel 24 are transformed into the corresponding detecting signals 42 by the detecting module 40, and the mainframe 22 performs different operations according to the detecting signals 42 and displays the images on the display panel 24.

The present invention combines the input and output interfaces together and provides users a lifelike and comfortable operating environment. For example, when creating a virtual driving environment, the computer system 20 can be used for simulating the rotation of the steering wheel. As FIGS. 13-14 show, users can rotate the interface apparatus 30 along the arrow 66 to simulate the rotation of the steering wheel. The image in the display panel 24 is "turned" with the rotation of the interface apparatus 30, and makes users feel tilted with respect to the virtual environment. Similarly, as FIGS. 11-12 show, when achieving a role-playing game, the computer system 20 can be used for simulating turning left/right in the virtual environment by swinging left/right. For example, when users want to "turn left" in the virtual environment, the interface apparatus 30 can be swung similarly to what is shown in FIG. 12 to simulate the "turn left" operation. The display panel 24 is moved to right side of the user and simulates the turning left to the user's head.

Figure 19:
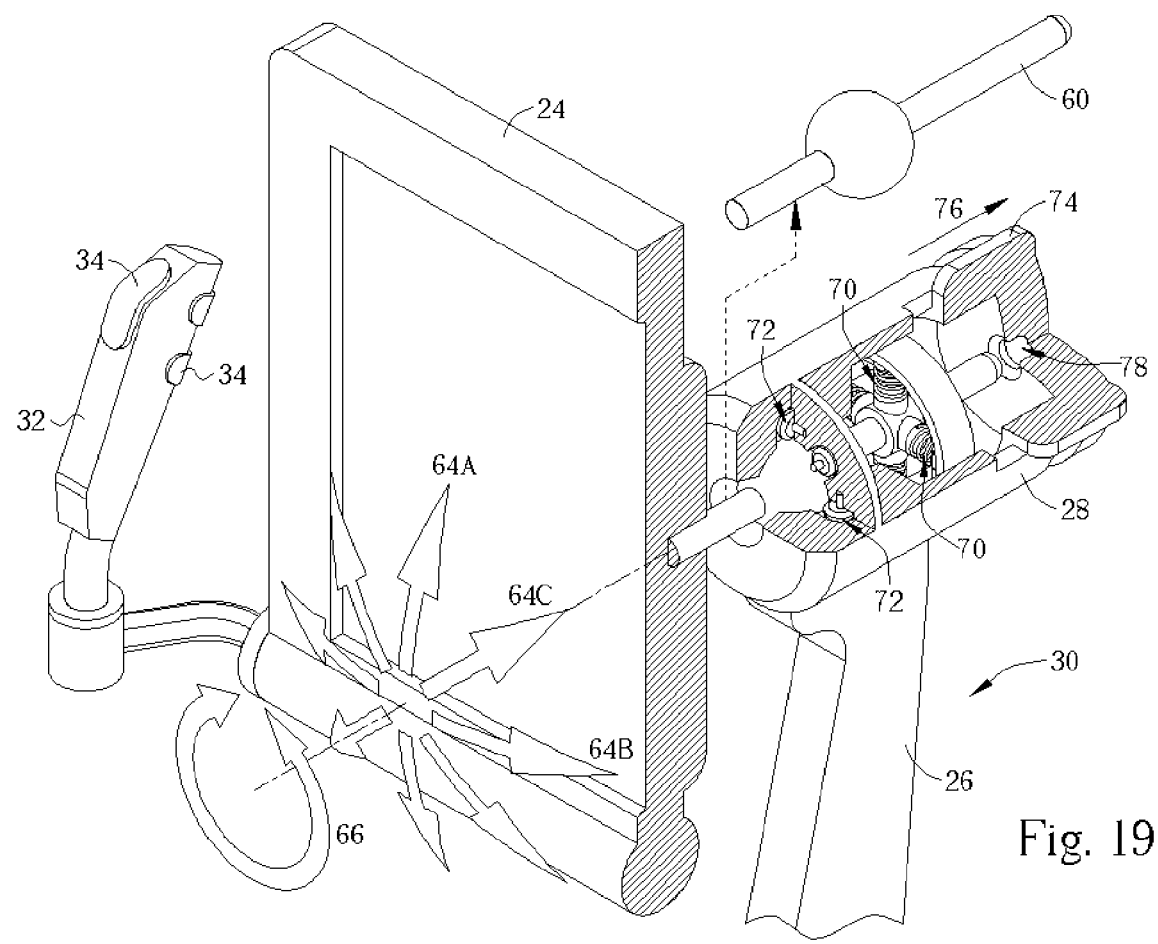
FIGS. 19-20 are schematic diagrams of an internal structure of an interface apparatus.

Please refer to FIG. 19 (and FIGS. 4, 18), which is a schematic diagram of the internal structure of the interface apparatus 30. Parts of the shaft base 28 and the display panel 24 are omitted in FIG. 19 for detailed explanation. In this embodiment, a spherical bearing is disposed on the shaft 60 and is embedded into a spherical trough in the shaft base 28. The shaft 60 can be rotated not only along the arrows 64A-64C but also along the central axis, like the arrow 66 shows. Springs 70 are located between the shaft 60 and the shaft base 28 to flexibly support the shaft 60. Blocks 72 are designed at sides of the spherical trough. When the shaft 60 rotates to different directions, the corresponding block 72 rotates. The detecting module 40 can detect the movement of the shaft 60 through detecting the rotation of the block 72, and output the corresponding detecting signal 42.

Figure 20:
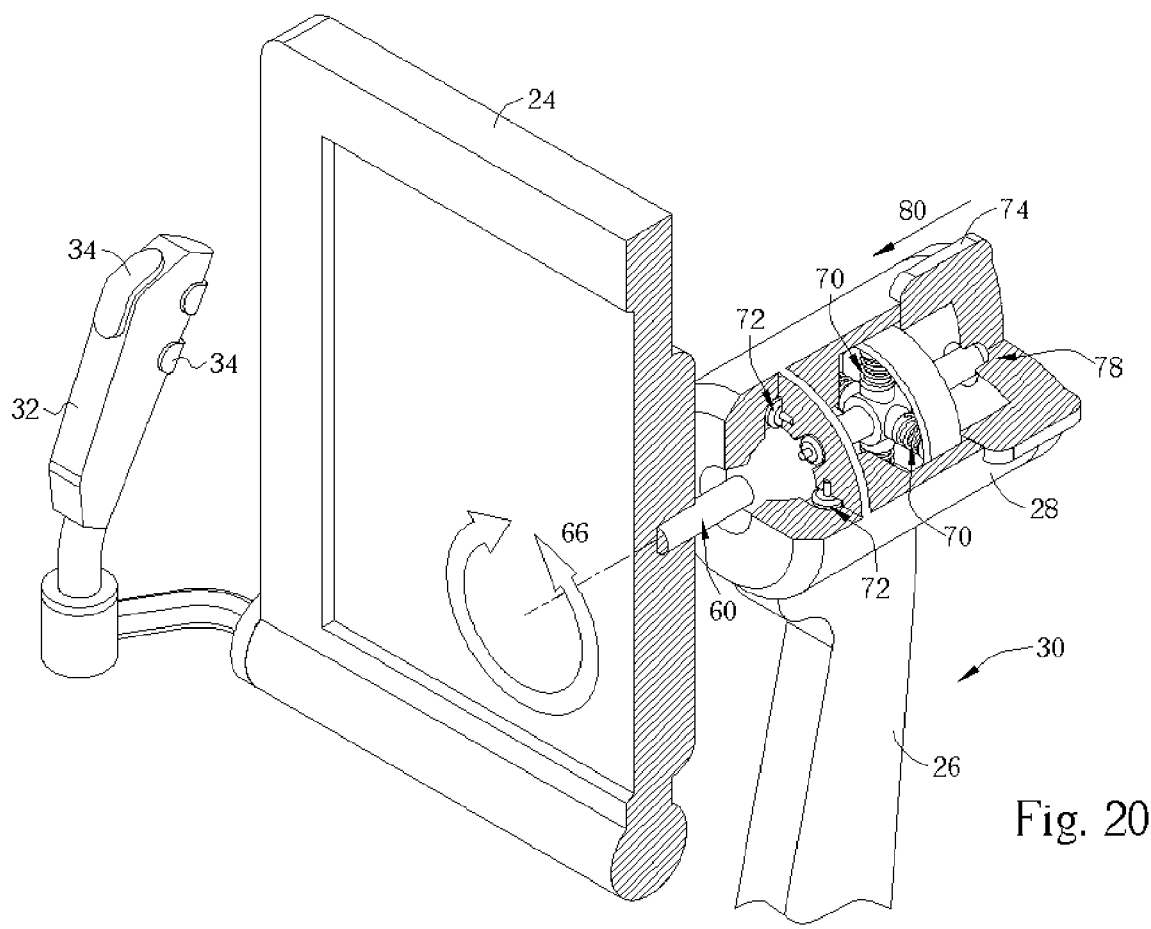

In this embodiment, the directions of movement of the shaft 60 (and the display panel 24) can be selectively locked. For example, in FIG. 19, users can lock the directions of movement along the arrows 64A-64C, and only allow movement in the direction 66. As FIG. 19 shows, a slidable sleeve 74 is disposed on the shaft base 28. The sleeve 74 has a hole 78 corresponding to the bottom of the shaft 60, and the moving directions 64A-64C are locked when the hole 78 fixes with the bottom of the shaft 60, as FIG. 20 shows. When the shaft 60 is locked as shown in FIG. 20, users operate the interface apparatus 30 similarly to driving a car. When the sleeve 74 separates from the shaft 60 along the arrow 76, the shaft 60 can move freely along the directions 64A-64C. Other directions of movement can also be locked by other similar mechanisms. When the movable directions of the interface apparatus 30 are locked as shown in FIGS. 11-12, the interface apparatus 30 can simulate the operation of a bicycle or a motorcycle. When the movable directions of the interface apparatus 30 are locked as shown in FIGS. 15-16, the interface apparatus 30 can simulate the operation of an airplane. In other words, selectively locking some directions of movement of the interface apparatus 30 can make the operating interface more lifelike.

Figure 21:
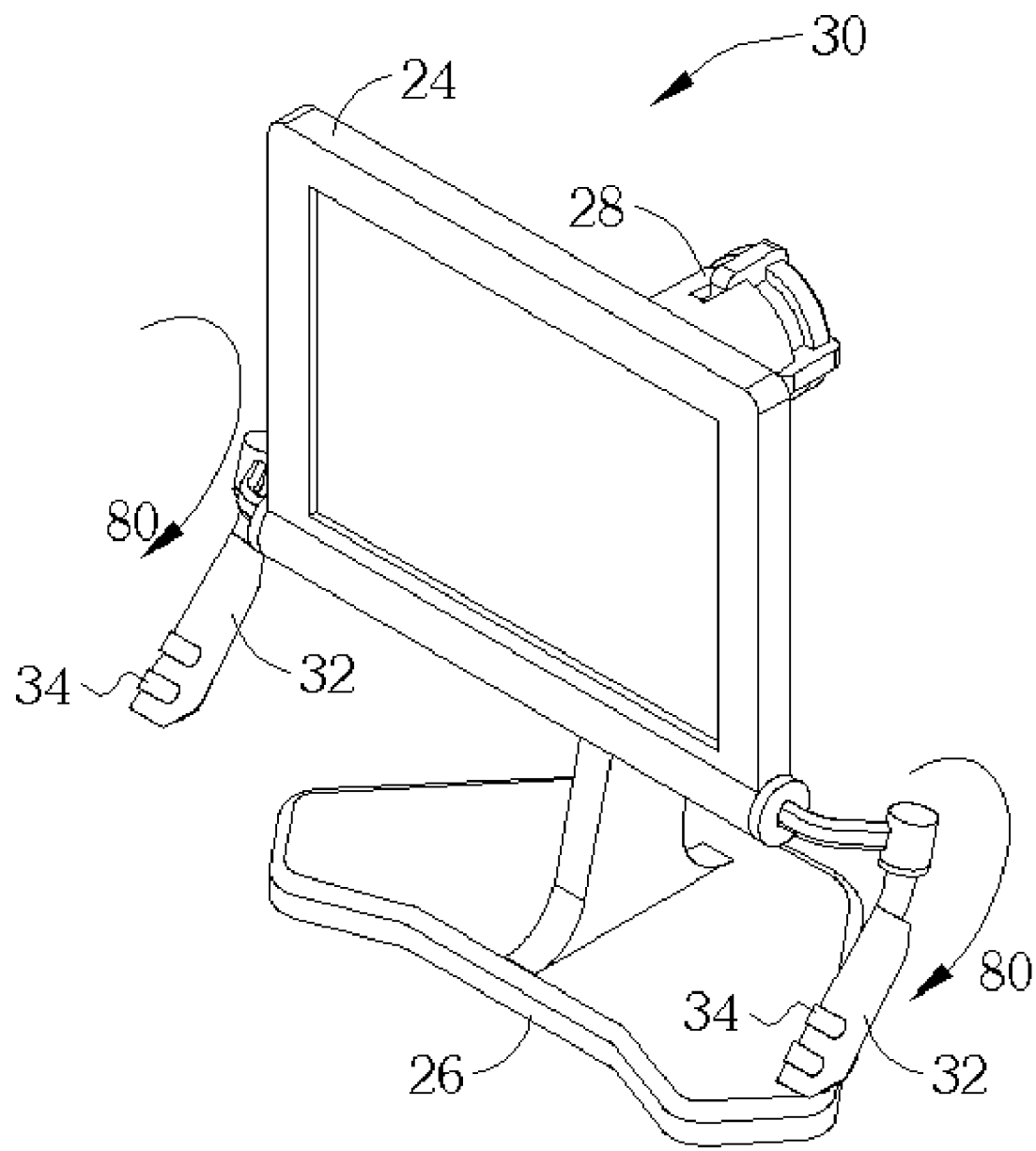
FIGS. 21-23 are schematic diagrams of an adjustable handle.
Figure 22:
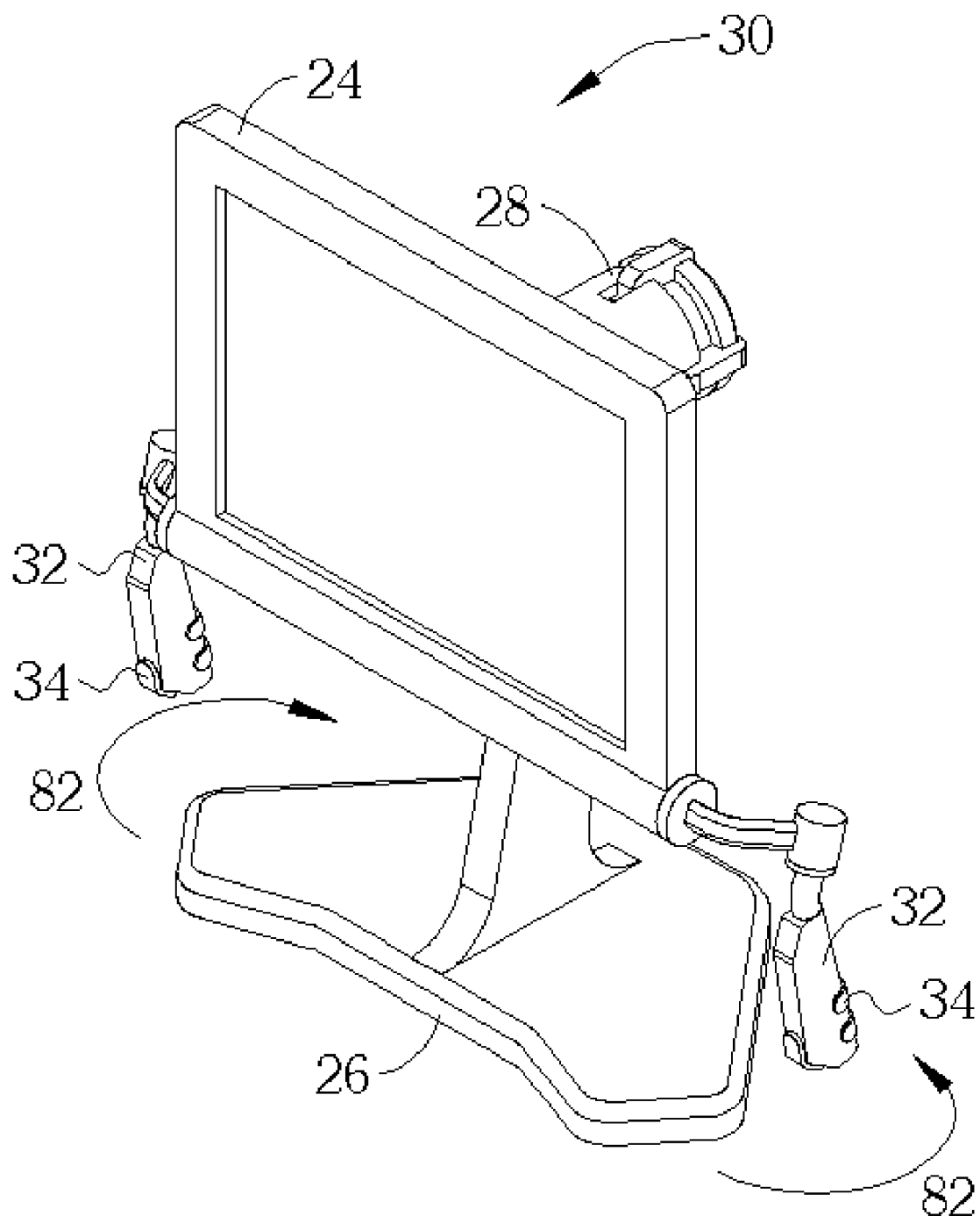
Figure 23:
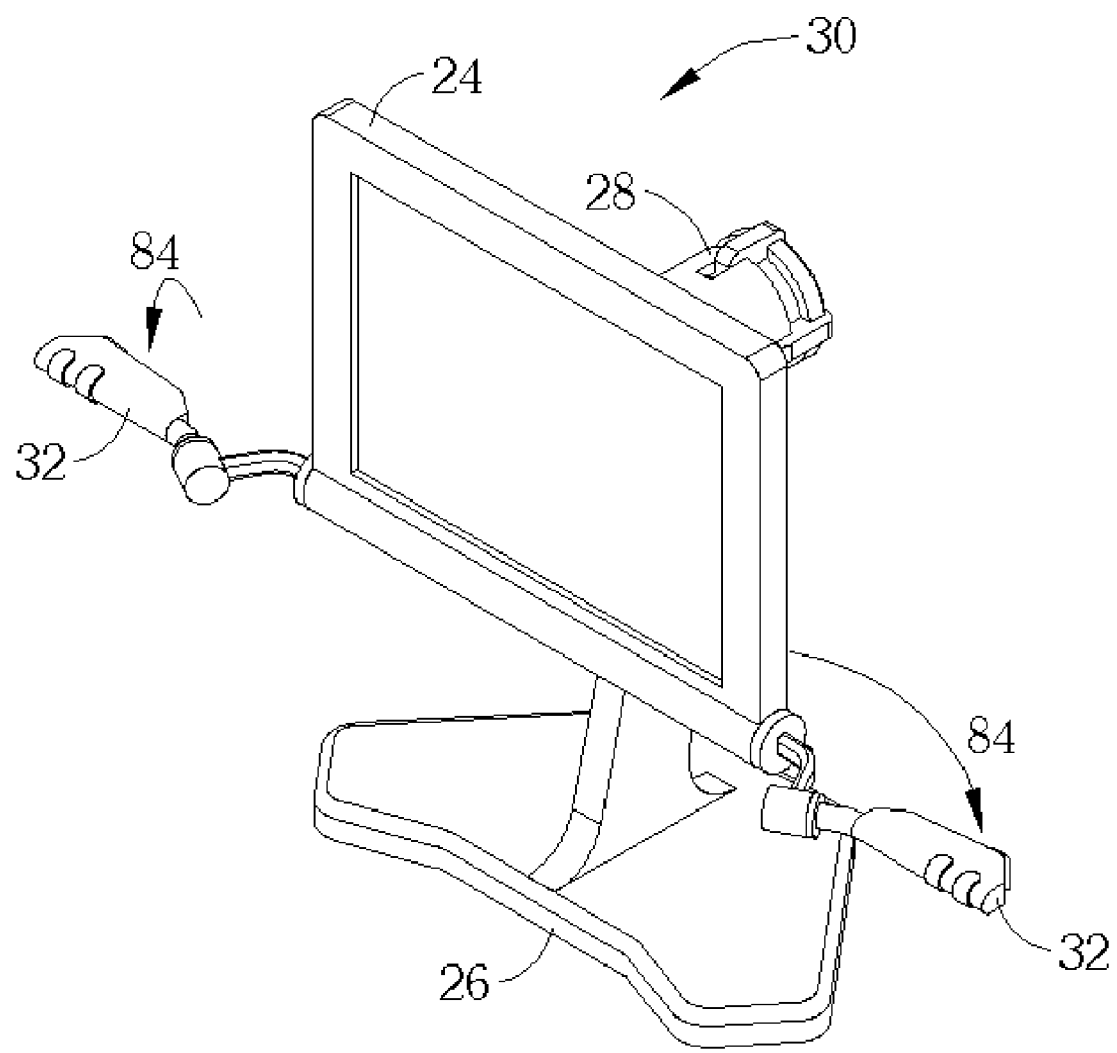

In this embodiment, please refer to FIGS. 21-23, where the position of the handle 32 on the display panel 24 is adjustable. FIGS. 21-23 show three different positions of the adjustable handle 32. The adjustable handle 32 allows users to adjust the handle 32 to a preferred position. The handle 32 can be rotated in directions indicated by the arrows 80, 82, and 84 shown in FIGS. 21-23, respectively. The handle 32 can be further designed as being detachable.

In contrast to the prior art, the present invention combines the display panel and the shaft together so that a virtual environment can be lifelike and comfortable.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An interface apparatus comprising:
    a base;
    a receiving circuit for receiving a video signal;
    a display panel for transforming the video signal into an image and displaying the image thereon;
    a shaft connected to the display panel and movably disposed on the base, the shaft comprising at least one handle connected to the display panel for a user to move the shaft, the position of each handle being adjustable with respect to the display panel, wherein the shaft is movable in up, down, left, right, or diagonal directions, and is rotatable in a plane parallel with a plane of the display panel; and
    a detecting module for detecting a movement of the shaft relative to the base and generating a detecting signal correspondingly;
    wherein when the shaft is moved, the shaft simultaneously moves the display panel, and the detecting module generates the detecting signal, and when the shaft and the display panel are rotated in the plane parallel with a plane of the display panel, the images displayed on the display panel move corresponding to the rotation of the interface apparatus.

2. The interface apparatus of claim 1 wherein the shaft further comprises:
    at least one button disposed on the handle for the user to press; and
    a button circuit outputting a corresponding button signal while the button is pressed.

3. The interface apparatus of claim 1 wherein the display panel is a liquid crystal display.

4. A computer system comprising:
    a mainframe providing a video signal; and
    an interface apparatus electrically connected to the mainframe, the interface apparatus comprising:
        a base;
        a receiving circuit for receiving the video signal;
        a display panel for transforming the video signal into an image and displaying the image;
        a shaft connected to the display panel and movably disposed on the base, the shaft comprising at least one handle connected to the display panel for a user to move the shaft, the position of each handle being adjustable with respect to the display panel, wherein the shaft is movable in up, down, left, right, or diagonal directions, and is rotatable in a plane parallel with a plane of the display panel; and
        a detecting module for detecting a movement of the shaft relative to the base and outputting a detecting signal;
    wherein when the shaft is moved, the shaft simultaneously moves the display panel, and the detecting module outputs the detecting signal to the mainframe, and when the shaft and the display panel are rotated in the plane parallel with a plane of the display panel, the images displayed on the display panel move corresponding to the rotation of the interface apparatus.

5. The computer system of claim 4 wherein the shaft further comprises:
    at least one button located on the handle for the user to press; and
    a button circuit outputting a corresponding button signal while the button is pressed, and the mainframe receiving the button signal and performing a relative operation.

6. The computer system of claim 4 wherein the display panel is a liquid crystal display.

* * * * *